United States Patent [19]
Nunome et al.

[11] Patent Number: 5,744,266
[45] Date of Patent: Apr. 28, 1998

[54] BATTERIES AND A METHOD OF MANUFACTURING POSITIVE ACTIVE MATERIAL FOR THE BATTERIES

[75] Inventors: Jun Nunome, Moriguchi; Takuya Nakashima, Neyagawa; Hiroshi Yoshizawa, Hirakata; Seiji Tao, Neyagawa, all of Japan

[73] Assignee: Matsushita Electric Industrial Co., Ltd., Kadoma, Japan

[21] Appl. No.: 791,586

[22] Filed: Jan. 31, 1997

[30] Foreign Application Priority Data

Feb. 2, 1996 [JP] Japan ................... 8-017279
Feb. 2, 1996 [JP] Japan ................... 8-017280
Mar. 5, 1996 [JP] Japan ................... 8-047177

[51] Int. Cl.$^6$ ................... H01M 4/50
[52] U.S. Cl. ................... 429/224; 429/218
[58] Field of Search ................... 429/224, 223, 429/206, 218, 194

[56] References Cited

U.S. PATENT DOCUMENTS

| | | |
|---|---|---|
| 4,605,603 | 8/1986 | Kanda et al. . |
| 4,837,119 | 6/1989 | Ikoma et al. . |
| 5,053,292 | 10/1991 | Hasebe et al. . |
| 5,277,890 | 1/1994 | Wang et al. . |
| 5,342,712 | 8/1994 | Mieczkowska et al. ........ 429/224 |
| 5,391,365 | 2/1995 | Wang et al. . |
| 5,393,617 | 2/1995 | Klein ........ 429/223 |
| 5,523,182 | 6/1996 | Ovshinsky et al. ........ 429/224 X |
| 5,585,142 | 12/1996 | Klein ........ 429/223 |
| 5,599,644 | 2/1997 | Swierbut et al. ........ 429/224 |
| 5,611,823 | 3/1997 | Klein ........ 429/223 X |

FOREIGN PATENT DOCUMENTS

| | | |
|---|---|---|
| 61-237366 | 10/1986 | Japan . |
| WO 93/18557 | 9/1993 | WIPO . |

*Primary Examiner*—Anthony Skapars
*Attorney, Agent, or Firm*—Ratner & Prestia

[57] ABSTRACT

Heavy-load discharge characteristics of a primary battery are improved. Alternatively, the high-rate discharge characteristics of a secondary battery are improved. This is accomplished by employing manganese oxides as the positive active material on which a surface modified layer is formed. The surface modified layer consists of an oxide of at least one element selected from the group consisting of titanium, cobalt, nickel, strontium, lanthanum and its compound added mainly with a compound made of manganese oxide on the surface of manganese oxide powder consisting of manganese dioxide or a complex oxide of manganese and lithium. This is accomplished by using a solution of salt of at least one element selected from the group consisting of titanium, cobalt, nickel, strontium, and lanthanum to which a manganese salt and a solution, to which a solution of manganese salt are added.

12 Claims, 9 Drawing Sheets

BATTERIES AND A METHOD OF MANUFACTURING POSITIVE ACTIVE MATERIAL FOR THE BATTERIES

FIELD OF THE INVENTION

The present invention relates to alkaline-manganese batteries or lithium-ion secondary batteries using the powder of manganese oxides, consisting of manganese dioxide or double oxide of manganese and lithium, on which a surface modification layer is formed as a positive active material, and a method of manufacturing said positive active material for the batteries made of manganese oxide powder on which a surface-modification layer is formed.

BACKGROUND OF THE INVENTION

Various primary batteries employing manganese dioxide as the positive active material such as the carbon-zinc dry batteries, called Leclanche type or zinc chloride type batteries, employing neutral salts of ammonium chloride or zinc chloride as electrolytes, have been well known. Also, alkaline manganese batteries employing potassium hydroxide as the electrolyte, and $Li/MnO_2$ system primary batteries belonging to organic electrolyte lithium batteries, employing manganese dioxide as the positive active material have been well-known.

On the other hand, lithium-ion secondary batteries which can be high-energy density small size rechargeable batteries in the next generation have also been known. These batteries employ positive and negative electrodes made of a host material repeating intercalation and deintercalation of lithium-ions by charging and discharging, realizing the heavy load discharge, rapid charge, long cyclic life, etc.

Presently, as the host material, a double oxide consisting of cobalt and lithium, or $LiCoO_2$, is used as the positive electrode, while carbon is generally used as the negative electrode. However, because of the unstable world supply from the high cost and omnipresence of positive electrode material or cobalt, this can now be replaced by $LiMnO_2$ or $LiMn_2O_4$ which are double oxides of manganese and lithium.

As the result of recent power consumption decreases realized by the significant advancement of semiconductor electronics technology, a number of portable electric and electronic apparatuses have been developed and practically used. Various audio visual (AV) apparatuses including the strobe-flash light for still-camera, portable shaver, headphone stereo-player, and liquid crystal display-television (LCD-TV) are typical of these advancements wherein the demand and the use of alkaline manganese batteries having excellent continuous discharge characteristics is now expanding very rapidly.

However, in contrast to these tendencies, increases of power consumption by the multi-functional portable apparatuses have been obvious. For example, in the cases of portable data acquisition (PDA) such as portable telephone and facsimile, notebook personal computer and camcorder, better battery performance taking heavy and continuous loads has been demanded.

Therefore, new built-in type secondary batteries such as the high-capacity nickel-cadmium system, nickel-metal hydride system, or lithium ion type batteries have been developed. At the same time, the demand for alkaline manganese batteries capable of continuous discharge at heavy load working as supplementary power sources is increasing.

When batteries are continuously discharged, decreases of operating voltages due to polarization are generally inevitable in proportion to the increase of load current. Thus, the end voltage is reached before the active materials of positive and negative electrodes are fully reacted so that the ultimate efficiency of active material remains low.

The polarization-based lowering of the operation voltage of discharging cells could be attributed to three reasons, including the resistance polarization due to the electrical ohmic resistance produced in the outer and inner cell, the activation polarization due to the charge transfer reaction, and the concentration polarization due to the diffusion control process of reaction materials or products.

Conventionally, in order to improve the continuous heavy load discharge characteristics of alkaline manganese batteries, the amount of electrolytic manganese dioxide (hereinafter, abbreviated as "EMD") contained in the positive active material is increased, a high conductivity graphite is used as the conductive material in the positive electrode mix, lowering the amount of additives, or a thin separator in which very fine fibers are uniformly distributed is employed.

Other than those discussed above, improvements introducing a gelling agent or a zinc corrosion inhibitor in the negative electrode have been considered effective. In addition to this, the employment of a positive electrode of larger polarization as compared to the zinc in the negative electrode has also been considered.

For example, as shown in U.S. Pat. Nos. 5,277,890 and 5,391,365, methods using EMD powder by expanding its specific surface by forming filament-like protrusions thereon by using a chemical synthetic method precipitating $MnO_2$ thereon have been developed. In addition to this, a method using a positive electrode to which powder of anatase titanium dioxide is added and mixed as shown in U.S. Pat. No. 5,342,712 has been disclosed.

Although these inventions have been slightly effective in increasing the battery service-life at continuous discharge and decreasing the polarization compared to a case where a conventional positive electrode made of EMD powder only is used, these had been minimally effective when a heavier load had to be discharged continuously.

SUMMARY OF THE INVENTION

Alkaline-manganese batteries and lithium-ion secondary batteries are disclosed having longer service lives at heavier loads and continuous discharge. These batteries are made of powder of manganese oxides employing manganese dioxide or double oxide of manganese and lithium acting as the positive active material on which surface modification layers are formed, and a method of manufacturing the positive active material for these batteries is disclosed.

$MnO_2$ powder or highly active EMD powder may be used as the positive active material of alkaline manganese batteries. Since the electronic conductivity of EMD powder is not necessarily very high, a conductive agent consisting mainly of graphite having no direct contribution to its conductivity had to be added up to an amount of 10 wt %.

The main discharge reaction of $MnO_2$ acting as the positive active material in the alkaline electrolyte, can be expressed by a uniform solid-phase reaction shown in Eq. (1), having appropriate conductivity of active material, and also the employment of the material minimizing the concentration polarization, due to the ion diffusion within the solid phase.

$$MnO_2 + H_2O + e \rightarrow MnOOH + OH^- \qquad (1)$$

The positive electrode potential is expressed by Eq. (2).

$$E = Eo - \frac{RT}{F} \ln \frac{[Mn^{3+}]solid}{[Mn^{4+}]solid} - \frac{RT}{F} \ln[OH^-] \quad (2)$$

As shown above, in accordance with an exemplary embodiment of the present invention, batteries are offered having excellent continuous discharge characteristics realized even when a heavy load is applied, by employing manganese oxide consisting of EMD powder whose surface is suitably modified as the positive active material, having a very little ohmic loss due to the electric resistance, and particularly having a small concentration polarization.

More specifically, batteries employing a positive active material consisting of manganese oxide powder having a surface modified by depositing thereon a layer of a compound consisting mainly of oxide of at least one element selected from the group consisting of titanium (Ti), cobalt (Co), nickel (Ni), strontium (Sr), and lanthanum (La) are disclosed.

DETAILED DESCRIPTION OF THE PREFERRED EMBODIMENTS

A typical structure of the alkaline manganese battery of the present invention and a method of manufacturing the positive active material for the same are now explained here by referring to the attached drawings and tables.

<Embodiment-1>

The EMD block electrodeposited on a Ti anode held in a high-temperature manganese sulphate bath, at a temperature of more than 90° C., is first peeled off from the Ti node. After coarsely crashing and washing the blocks of EMD, it is pulverized by a roller-mill to obtain EMD powder having an average grain diameter of 50 μm, and this is dried by a conventional method to obtain EMD powder.

Figure 1:
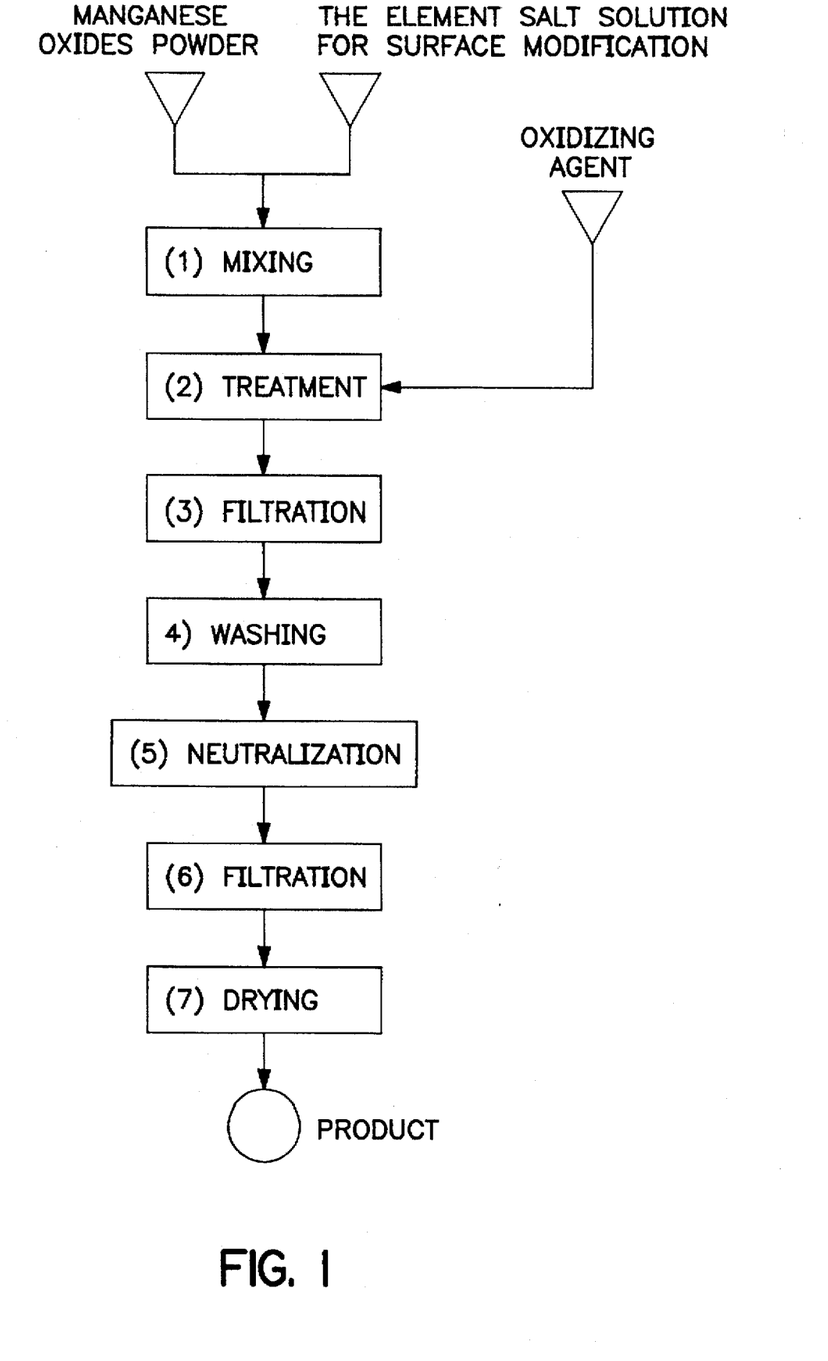
FIG. 1 shows a flow-chart of the manufacturing process of the positive active material of the present invention consisting of manganese oxide having a surface modified layer.

Then the surface of EMD powder is subjected to a modification treatment according to the flow-chart of the manufacturing process shown in FIG. 1.

(1) Mixing—300 grams of the EMD powder is weighed, mixed, and dispersed in an aqueous solution of 3.0 liters containing titanium sulfate which is neutral or of $H_2SO_4$ acidity.

(2) Treatment—By heating the solution having said EMD powder dispersed within, a Ti compound is deposited and coated on the surface of EMD powder, modifying the surface thereof. A treatment temperature of 80° C. is used in this case. The treatment can be accelerated by bubbling into the solution the oxidizing gas such as air, oxygen, or ozone containing the air or oxygen, or by adding an oxidizing agent such as sodium perchlorate ($NaClO_3$) or sodium persulfate ($Na_2S_2O_8 \cdot 2H_2O$) thereto.

(3) Filtration—The EMD powder whose surface is modified is filtrated in this process, and this process may be replaced by a decantation of the supernatant solution, and this is shifted into the successful washing process.

(4) Washing—Pouring and stirring of pure water, and removal of the supernatant solution is repeated several times.

(5) Neutralization—By adding drops of an aqueous sodium hydroxide solution in a state of agitation, the pH thereof is stabilized into a range from 6.0 to 8.0.

(6) Drying—The product is dried for 24 hours at 80° C.

In addition to above, the surface modification shown in the processes of (1)–(3), may be replaced by processes of coarse crushing of EMD grain, (4) Washing, (5) Neutralization, and a process of Pulverizing. Furthermore, stabilizing and improving the characteristics of modified EMD are possible by applying a heat treatment in an aqueous sulfuric acid aqueous solution after Treatment (2).

The electric conductivity, moistures, and the discharge capacity ratios of positive active materials determined by the addition of sulfuric acid ($H_2SO_4$) to $Ti(SO_4)_2$ aqueous solution and the types of oxidizing agent are listed in Table 1 shown below.

TABLE 1

| Sample No. | 1 | 2 | 3 | 4 | 5 | 6 | 7 | 8 | 9 | 10 | 11 |
|---|---|---|---|---|---|---|---|---|---|---|---|
| Composition of Treatment Solution | | | | | | | | | | | |
| Ti($SO_4$)$_2$ (mol/l) | — | 0.2 | 0.2 | 0.2 | 0.2 | 0.2 | 0.2 | — | 0.2 | 0.2 | 0.2 |
| $H_2SO_4$ (mol/l) | — | 2.0 | 2.0 | 2.0 | 2.0 | 2.0 | 2.0 | 2.0 | — | — | — |
| Oxidizing Agent | | | | | | | | | | | |
| Air (ml/min) | — | — | — | — | 50 | — | — | — | — | 50 | — |
| $O_2$ (ml/min) | — | — | — | — | — | 50 | — | — | — | — | — |
| $O_3$ (ml/min) | — | — | — | — | — | — | 50 | — | — | — | — |
| $Na_2ClO_3$ | — | ○ | — | — | — | — | — | — | ○ | — | — |
| $Na_2S_2O_3 2H_2O$ | — | — | ○ | — | — | — | — | — | — | — | — |
| Electric Conductivity ($\times 10^{-3}$ S/cm) | 13.7 | 995 | 990 | 800 | 930 | 950 | 950 | 14.0 | 810 | 870 | 570 |
| Moisture (wt %) | 4.58 | 4.90 | 4.80 | 4.20 | 4.55 | 4.35 | 4.43 | 4.12 | 4.05 | 4.32 | 4.55 |
| Discharge Capacity Ratio | 100 | 107 | 106 | 105 | 107 | 107 | 106 | 101 | 105 | 106 | 104 |

In Table 1, the ozone ($O_3$) content in the oxidizing agent causes direct bubbling of oxygen ($O_2$), including the $O_3$ generated by the flow-in of $O_2$ into the ozonizer, at a flow rate of 50 ml/min into the treatment solution.

The electric conductivity is determined by placing the sample powder of predetermined volume in a die made of PTFE, and by measuring the terminal DC resistance at a state where a pressure of 3t/cm² is applied. The moisture is determined by subtracting the weight of the sample heated and dehydrated at 500° C. from the weight of the sample dried at 105° C.

In addition to these determinations, preparing a working positive electrode by pressing a mixture of sample powder of 10 weight parts mixed with acetylene black of 1 weight part onto a platinum (Pt) plate, using a counter electrode made of Pt plate and a reference electrode made of Hg/HgO, and by measuring the capacity of the positive electrode potential reaching to a potential of −300 mV from the reference electrode potential, applying a constant current of 10 mA per one gram of the sample in an alkaline electrolyte consisting of 40 wt % potassium hydroxide (KOH) aqueous solution, dissolving 3.0 wt % zinc oxide (ZnO), and the capacity ratios of each sample are derived, defining the capacity of the EMD powder sample No. 1 as 100.

Here, the discharge end potential of −300 mV is employed as a potential corresponding to the discharge ending voltage of a 0.9 V alkaline manganese battery.

Table 1 shows that all of the electric conductivity of Sample Nos. 2–7 and Nos. 9–10 obtained by treating the EMD powder in a Ti($SO_4$)$_2$ aqueous solution are higher by about two orders compared to that of untreated EMD powder Sample No. 1. Among these, the tendency for slightly higher electric conductivity is observed when $H_2SO_4$ is added to the treatment solution (Sample Nos. 2–7). These tendencies are obvious, particularly when $H_2SO_4$ is added together with the oxidizing agent (Sample Nos. 2, 3, 5, 6, and 7). In addition to these, no particular differences based on the type of oxidizing agent have been observed.

The electron-microscopic observations made on the surfaces of untreated EMD powder of Sample No. 1 and those of Sample No. 2, obtained by treating the EMD powder in an $H_2SO_4$ acidity Ti($SO_4$)$_2$ aqueous solution being added by an $Na_2ClO_3$ oxidizing agent, showed a little surface irregularity for Sample No. 1 and less irregularity for Sample No. 2. This can be attributed to the irregularities smoothed out by the deposition.

Since a moisture of up to 5 wt. % is usually contained in EMD powder, the content of $MnO_2$ and the electric conductivity could be increased by the removal of moisture which could be done by applying a heat treatment. However, it is sacrificing capacity by the positive electrode potential being lowered by the discharge in the alkaline electrolyte.

Table 1 shows that not only the electric conductivity is improved by two orders, but a significantly increased discharge capacity can be obtained without reducing the moisture by using the EMD powder on which a surface modified layer is formed by using a Ti compound.

It has been confirmed by using an element analysis method that the content of titanium in Sample No. 2 is around 1.8 wt. %. Thus, this is attributed to the EMD powder whose entire or partial surface is modified by the thin deposition of the titanium compound consisting essentially of titanium oxide. Although the exact determination of the thickness of the surface modified layer is impossible even with an X-ray diffraction method because of its extremely small thickness. However, the effectiveness of the surface modified layer is obvious.

Figure 2:
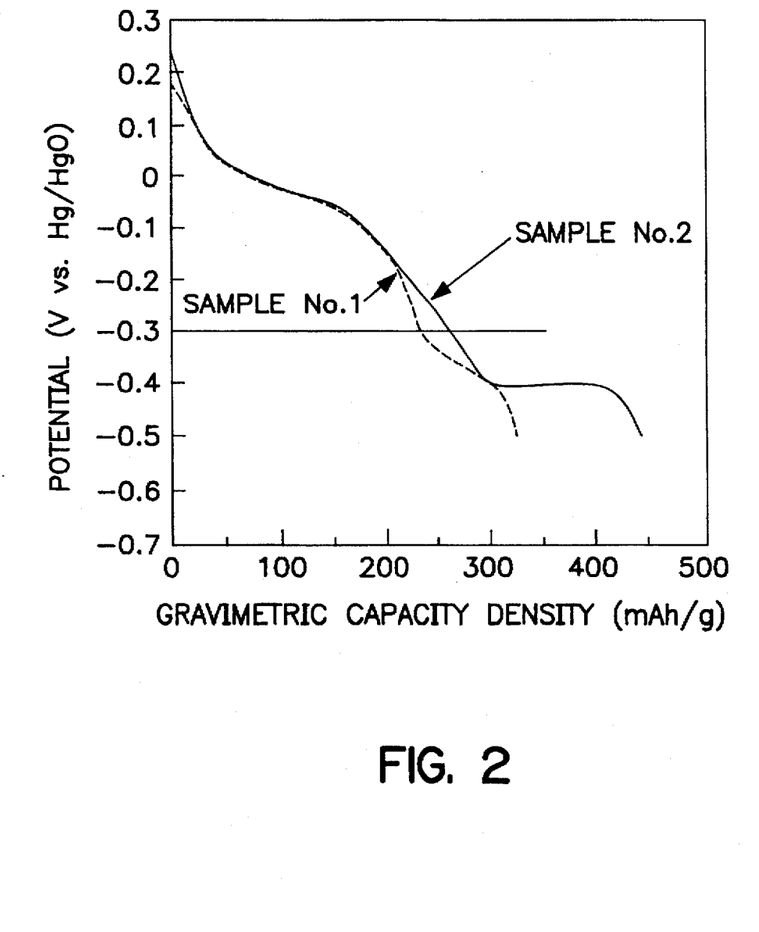
FIG. 2 shows examples of comparative transition curves of single electrode potentials of positive active materials made of surface modified by the present invention and conventional untreated EMD powder placed in an alkaline electrolyte.

FIG. 2 shows two discharge characteristics of unipolar electrode potential in an alkaline electrolyte obtained with Sample Nos. 1 and 2.

In FIG. 2, while a rapid potential decrease of Sample No. 1 employing untreated EMD powder at the end of discharge is observed, a gentle potential decrease of Sample No. 2 employing the EMD powder on which a surface layer modified by a titanium compound is found, and this can be attributed to the significant improvement in capacity. In addition, no particular surface modification effect has been observed with Sample No. 8 employing the EMD powder treated by sulfuric acid, and very little change is observed with Sample No. 1.

<Embodiment-2>

By adjusting the concentration of sulfuric acid in the treatment solution to 2.0 mol/l, various surface modified EMD powders of different titanium content are prepared in accordance with Embodiment-1 by changing the concentration of Ti($SO_4$)$_2$ and the treatment condition.

Figure 3:
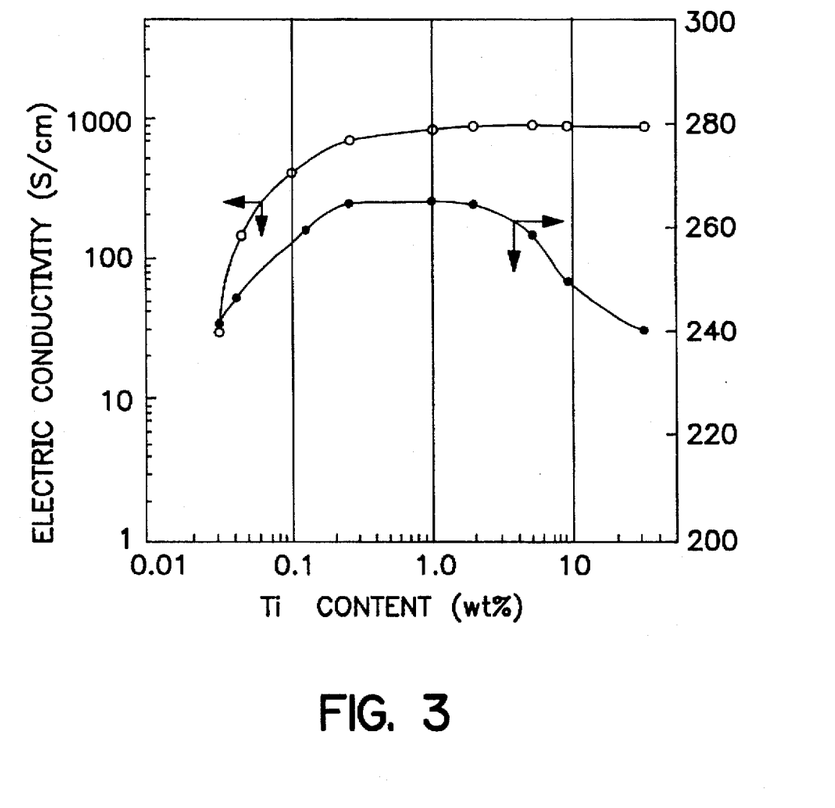
FIG. 3 shows a relationship between the amount of titanium contained in the EMD powder of the present invention whose surface is modified, the electric conductivity, and the gravimetric capacity density thereof.

From these, the gravimetric capacity densities (mAh/g) are determined from the measurements of electrical conductivity and the single electrode discharge tests, and the results of these are shown in FIG. 3.

FIG. 3 also shows a steady increase in the electric conductivity in proportion to the increase of Ti content in contrast to that of Sample No. 1 which is fixed at 13.7×10-3 S/cm, and also shows a near saturation of electric conductivity at a point exceeding 0.1 wt. %. On the other hand, the gravimetric capacity density is found optimum with a titanium content in a range from 0.1–5.0 wt. %.

<Embodiment-3>

Various positive active materials whose surfaces are modified are prepared by adding salts of manganese, nickel, or cobalt to the $H_2SO_4$ acidity $Ti(SO_4)_2$ treatment solution according to Embodiment-1, and the electric conductivity, moistures, and the apparent densities thereof are measured. Then, after preparing various LR6 (AA) type alkaline manganese batteries, the discharge capacity ratios at heavy and medium loads are determined.

Figure 4:
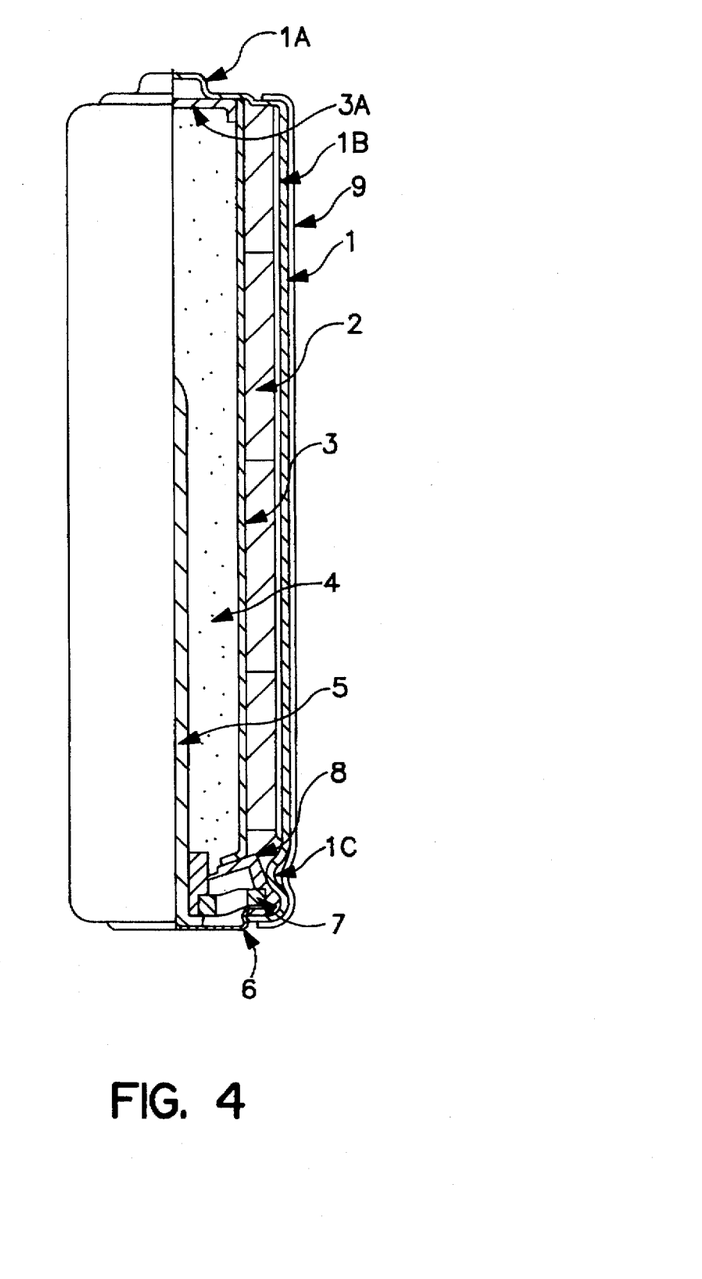
FIG. 4 shows a half vertical cross-section of a LR6(AA) size alkaline manganese battery which is a typical example of the battery of the present invention.

A cross-section of the experimental, LR6 size alkaline manganese battery is shown in FIG. 4 wherein the cap 1A made of nickel plated steel acting as its positive terminal is integrally molded, and conductive coating 1B made of carbon paint is coated on the inner wall of the positive can 1.

Then, manganese oxide made either of untreated EMD powder or various surface modified EMD powder mixed with graphite, at a weight ratio of 9 to 1, is press-molded into a shape of cylinder, and four of the cylinders are inserted into said positive can 1, and positive electrode mold 2 is press-molded on the inner wall of positive can 1.

Inserting cylinder-shaped separator 3 and bottom plate 3A within positive electrode mold 2, gel negative electrode 4, prepared by dispersing the zinc powder of 2 weight parts in a viscous solution of 1 weight part and dissolving a gelling agent made of carboxymethyl cellulose (CMC) or polysodium acrylate or others injected into said alkaline electrolyte.

Then, negative electrode terminal 6 made of nickel-plated steel on which brass current collector 5 is welded and washer 7 are integrated by plastic sealer 8, this unit is inserted into gel negative electrode 4. Where sealer 8 is placed on groove 1C formed by inwardly curling the opening of positive can 1, the upper edge of said can 1 is curled, inwardly sealing the can. This cell assembly process is ended by sticking label 9 thereon at the end.

The discharge test of each cell is performed under a heavy load giving a constant current of 1000 mA and under a medium load giving a constant resistance of 10 ohms continuous discharge, obtaining a discharge-end voltage of 0.9 V in both cases. Table 1 shows a tabulation of discharge periods wherein the discharge period obtained by Sample No. 1 cell, employing a positive active material made of untreated EMD powder, is defined as 100, and those of other cells, each employing positive active material made of treated EMD powder of which surface layer is modified, are defined as the ratios of those to that of Sample No. 1.

The results of these are tabulated in Table 2.

TABLE 2

| Sample No. | 1 | 2 | 12 | 13 | 14 | 15 | 16 | 17 | 18 | 19 | 20 |
|---|---|---|---|---|---|---|---|---|---|---|---|
| Composition of Treatment Solution | | | | | | | | | | | |
| Ti $(SO_4)_2$ (mol/l) | — | 0.2 | 0.2 | 0.2 | 0.2 | 0.2 | 0.2 | 0.2 | 0.2 | 0.2 | 0.2 |
| $H_2SO_4$ (mol/l) | — | 2.0 | 2.0 | 2.0 | 2.0 | 2.0 | 2.0 | 2.0 | 2.0 | 2.0 | 2.0 |
| $MnSO_4$ (mol/l) | — | — | 0.2 | — | — | 0.2 | 0.2 | — | 0.2 | 0.2 | 0.2 |
| $CoSO_4$ (mol/l) | — | — | — | 0.2 | — | 0.2 | — | 0.2 | 0.2 | 0.2 | 0.2 |
| $NiSO_4$ (mol/l) | — | — | — | — | 0.2 | — | 0.2 | 0.2 | 0.2 | 0.2 | 0.2 |
| Kind of Oxidiing Agent | | | | | | | | | | | |
| Air (ml/min) | — | — | — | — | — | — | — | — | — | 50 | — |
| $O_2$ (ml/min) | — | — | — | — | — | — | — | — | — | — | 50 |
| $Na_2ClO_3$ | — | ○ | ○ | ○ | ○ | ○ | ○ | ○ | ○ | — | — |
| Electrical Conductivity (×10$^{-3}$ S/cm) | 13.7 | 995 | 990 | 990 | 930 | 950 | 950 | 950 | 970 | 980 | 920 |
| Moisture (wt %) | 4.58 | 4.9 | 4.2 | 4.2 | 4.55 | 4.15 | 4.13 | 4.12 | 4.05 | 4.12 | 4.15 |
| Apparent Density (g/cm$^3$) | 2.67 | 2.60 | 2.92 | 2.65 | 2.66 | 2.93 | 2.90 | 2.64 | 2.96 | 2.87 | 2.89 |
| Heavy Load Discharge Capacity Ratio | 100 | 100 | 100 | 105 | 105 | 103 | 103 | 105 | 105 | 105 | 105 |
| Medium Load Discharge Capacity Ratio | 100 | 107 | 106 | 105 | 105 | 107 | 106 | 102 | 105 | 106 | 104 |

While the electric conductivity of untreated EMD powder of Sample No. 1 is 13.7×10-3 S/cm, those of the others using the treatment which include titanium salt solution containing either the salt of manganese, nickel, cobalt, etc., are higher by two orders. Moistures of Sample Nos. 12, 15, 16, 18, 19 and 20 added with manganese salt are known to be slightly less than that of Sample No. 1, and there is also a slight increase of the apparent densities.

These results can be attributed to a possible deposition of chemical manganese dioxide (CMD) having a fundamentally low moisture (less than 1.0%) on EMD simultaneously with the deposition of a compound consisting mainly of titanium oxide.

Considerably improved heavy load discharge characteristics are found with Sample Nos. 13–20 depositing a cobalt and/or-nickel compound mixed with a titanium compound. The considerable improvements of heavy load discharge characteristics cannot only be explained by the nobler potential of CoOOH and/or NiOOH of cobalt and/or nickel oxide deposited together with the titanium oxide, but it can probably be explained by the suppressed concentration polarization together with the suppressed resistance polarization taking place during the discharge.

Moreover, since the electric conductivity of surface modified EMD including the titanium compound is improved, the content of conductive agent such as graphite could be reduced at a level less than 10 wt. %. However, the dependency on the type of oxidizing agents has not been clearly shown.

<Embodiment-4>

In Embodiment-3 described above, the improvements of heavy load discharge characteristics of alkaline manganese batteries by employing the EMD powder whose surface is modified by a titanium compound together with a compound of cobalt and/or nickel which have previously been explained.

Therefore, in Embodiment-4 shown here, LR6 size alkaline manganese batteries, utilizing a positive active material formed on the EMD powder whose surface layer is modified, are prepared in accordance with Embodiment-1, using a solution of cobalt salt and/or nickel salt, or cobalt salt and/or nickel salt including the manganese salt excluding the use of titanium salt in the treatment solution.

All of these batteries are subjected to a continuous discharge test supplying a constant current of 1500 mA (obtaining an end voltage of 0.9 V), and the discharge capacity ratios of those batteries, defining that obtained by Sample No. 1 using untreated EMD powder as 100, are determined. The results of those tests are shown in Tables 3, 4, and 5.

TABLE 3

| Sample No. | 1 | 21 | 22 | 23 | 24 | 25 | 26 | 27 | 28 | 29 |
|---|---|---|---|---|---|---|---|---|---|---|
| Composition of Treatment Solution | | | | | | | | | | |
| $H_2SO_4$ (mol/l) | — | 2.0 | 2.0 | 2.0 | 2.0 | 2.0 | 2.0 | — | — | — |
| $CoSO_4$ (mol/l) | — | 0.2 | 0.2 | 0.2 | 0.2 | 0.2 | 0.2 | 0.2 | 0.2 | 0.2 |
| Oxidizing Agent | | | | | | | | | | |
| Air (ml/min) | — | — | — | — | 50 | — | — | — | — | 50 |
| $O_2$ (ml/min) | — | — | — | — | — | 50 | — | — | — | — |
| $O_3$ (ml/min) | — | — | — | — | — | — | 50 | — | — | — |
| $Na_2ClO_3$ | — | — | O | — | — | — | — | — | O | — |
| $Na_2S_2O_8 \cdot 2H_2O$ | — | — | — | O | — | — | — | — | — | — |
| Discharge Capacity Ratio | 100 | 104 | 106 | 106 | 105 | 104 | 106 | 104 | 104 | 106 |

TABLE 4

| Sample No. | 1 | 30 | 31 | 32 | 33 | 34 | 35 | 36 | 37 | 38 |
|---|---|---|---|---|---|---|---|---|---|---|
| Composition of Treatment Solution | | | | | | | | | | |
| $H_2SO_4$ (mol/l) | — | 2.0 | 2.0 | 2.0 | 2.0 | 2.0 | 2.0 | — | — | — |
| $NiSO_4$ (mol/l) | — | 0.2 | 0.2 | 0.2 | 0.2 | 0.2 | 0.2 | 0.2 | 0.2 | 0.2 |
| Kind of Oxidizing Agent | | | | | | | | | | |
| Air (ml/min) | — | — | — | — | 50 | — | — | — | — | 50 |
| $O_2$ (ml/min) | — | — | — | — | — | 50 | — | — | — | — |
| $O_3$ (ml/min) | — | — | — | — | — | — | 50 | — | — | — |
| $Na_2ClO_3$ | — | — | O | — | — | — | — | — | O | — |
| $Na_2S_2O_8 \cdot 2H_2O$ | — | — | — | O | — | — | — | — | — | — |
| Discharge Capacity Ratio | 100 | 105 | 107 | 106 | 107 | 107 | 106 | 104 | 105 | 106 |

TABLE 5

| Sample No. | 1 | 39 | 40 | 41 | 42 | 43 | 44 | 45 | 46 | 47 | 48 |
|---|---|---|---|---|---|---|---|---|---|---|---|
| Composition of Treatment Solution | | | | | | | | | | | |
| $H_2SO_4$ (mol/l) | — | 2.0 | 2.0 | 2.0 | 2.0 | 2.0 | 2.0 | 2.0 | 2.0 | — | — |
| $CoSO_4$ (mol/l) | — | 0.2 | — | 0.2 | 0.2 | 0.2 | 0.2 | 0.2 | 0.2 | 0.2 | 0.2 |
| $NiSO_4$ (mol/l) | — | 0.2 | 0.2 | — | 0.2 | 0.2 | 0.2 | 0.2 | 0.2 | 0.2 | 0.2 |
| $MnSO_4$ (mol/l) | — | — | 0.2 | 0.2 | 0.2 | 0.2 | 0.2 | 0.2 | 0.2 | — | 0.2 |
| Kind of Oxidizing Agent | | | | | | | | | | | |
| Air (ml/min) | — | — | — | — | — | — | 50 | — | — | — | — |
| $O_2$ (ml/min) | — | — | — | — | — | — | — | 50 | — | — | — |
| $O_3$ (ml/min) | — | — | — | — | — | — | — | — | 50 | — | — |
| $Na_2ClO_3$ | — | O | O | O | O | — | — | — | — | — | — |

TABLE 5-continued

| Sample No. | 1 | 39 | 40 | 41 | 42 | 43 | 44 | 45 | 46 | 47 | 48 |
|---|---|---|---|---|---|---|---|---|---|---|---|
| $Na_2S_2O_8 \cdot 2H_2O$ | — | — | — | — | — | ○ | — | — | — | — | — |
| Apparent Density (g/cm³) | 2.67 | 2.65 | 3.03 | 2.98 | 2.92 | 2.92 | 2.97 | 3.00 | 3.01 | 2.66 | 2.88 |
| Discharge Capacity Ratio | 100 | 106 | 105 | 105 | 106 | 107 | 106 | 107 | 105 | 104 | 105 |

Figure 5:
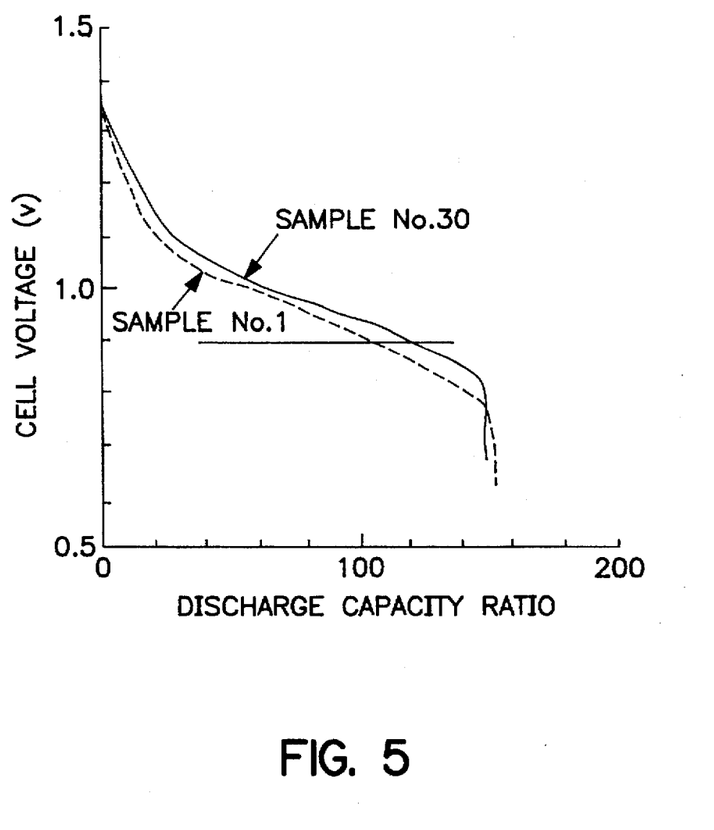
FIG. 5 shows a relationship between the discharge characteristics of alkaline manganese batteries employing positive active material of the present invention having a surface layer modified by a nickel compound with those obtained by employing conventional positive active material made of untreated EMD powder.

Characteristic examples of 1500 mA constant current continuous discharge characteristics of an alkaline manganese battery using the positive active material employed by Sample No. 1 and Sample No. 30 are shown in FIG. 5.

FIG. 5 shows a higher discharge capacity up to a discharge end voltage of 0.9 V since the discharge voltage is improved by using EMD powder whose surface layer is modified by a nickel compound made mainly of nickel oxide, which could be NiOOH, used as the positive electrode.

In addition, no noticeable difference between the points at which the discharge capacity is lost and at which the discharge voltage is rapidly decreased has been observed.

In the cases where the surface of EMD powder is modified by introducing a Co and/or Ni compound or a Co and/or Ni compound containing a Mn compound into the treatment solution, instances of a slightly higher discharge voltage and discharge capacity ratio have been observed when the treatment solution of $H_2SO_4$ acidity (Samples Nos. 21–26, 30–35, and 39–46) is used compared with the case where the treatment solution of no $H_2SO_4$ acidity is used.

Moreover, though no particular effect of the oxidizing agent has been observed in this case, slightly improved discharge characteristics realized by the introduction of an oxidizing agent in the treatment process have been seen.

In this embodiment also, like in the case of Embodiment-3, the higher apparent density realized by the introduction of manganese salt in the treatment solution has been observed.

Figure 6:
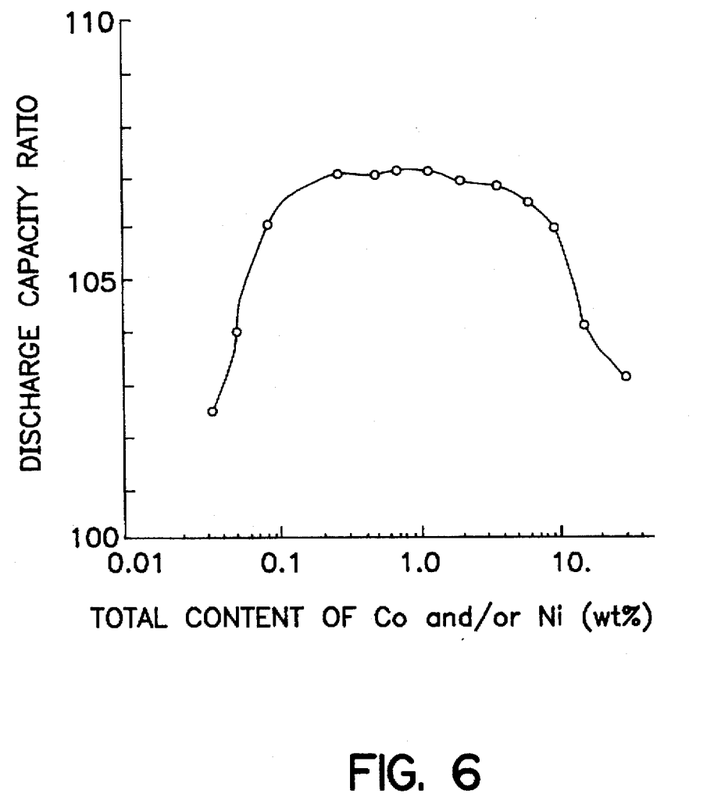
FIG. 6 shows a relationship between the total amount of Co and/or Ni contained in the modified surface layer of EMD powder and the discharge capacity ratio.

FIG. 6 shows the relationship between the discharge capacity as a ratio of a positive electrode made of EMD powder whose surface is modified by the deposition of Co and/or Ni compound and the total contents of Co and/or Ni. Like in the cases of Embodiments-1 and -2, the discharge capacity ratios are determined by conducting single electrode discharge tests in an alkaline electrolyte and defining the ratio obtained by the untreated EMD powder as 100. FIG. 6 also shows the discharge capacity ratios of every EMD powder whose surface layers are modified by using a Co and/or Ni compound, and these are higher than that (240 mAh/g) of untreated EMD powder. It shows the effectiveness of the total contents of Co and/or Ni in a range from 0.1–10.0 wt %. in these cases.

Electron-microscopic observations made on the surface of EMD powder modified by a Co and/or Ni compound and a Co and/or Ni compound containing a Mn compound, like the case where the surface is modified by a Ti compound, have proved the order of surface irregularities less than those observed on the untreated EMD powder. Moreover, like the cases of Embodiments -3 and -4, the higher apparent densities of surface modified EMD powder containing a Mn compound (Sample Nos. 40–46 and 48) are observed.

<Embodiment-5>

Embodiments 1–4 have proved the effectiveness of EMD powder whose surfaces are modified by forming a Ti compound or a Co (cobalt) and/or Ni (nickel) compound and by forming a Ti compound containing Mn or Co and/or Ni compound. In Embodiment -5, the effects of the surface modification by using a Sr (strontium) and/or La (lanthanum) compound, and by using a Sr (strontium) and/or La (lanthanum) compound containing Mn compound are shown.

Like the case of Embodiment -1, various LR6-size alkali manganese batteries employing the EMD powder whose surface is modified by a Sr (strontium) and/or La (lanthanum) compound, and by a Sr (strontium) and/or La (lanthanum) compound containing a Mn compound as its positive active material, are prepared, and these are subjected to a pulse discharge test.

The pulse discharge test is a test simulating a strobe flash for a still-camera where the discharge is repeated for 15 sec., on a constant resistance of 1.8 ohms allowing a rest period of 45 sec., the number of the discharges is counted until an end voltage of 0.9 V is reached. The number of pulse discharges obtained by the cell of Sample No. 1 employing untreated EMD powder is defined as 100, the ratio of the number of pulse discharges obtained by a cell employing surface modified EMD powder is expressed by the discharge capacity ratio. These results are shown in Tables 6, 7, and 8.

Figure 7:
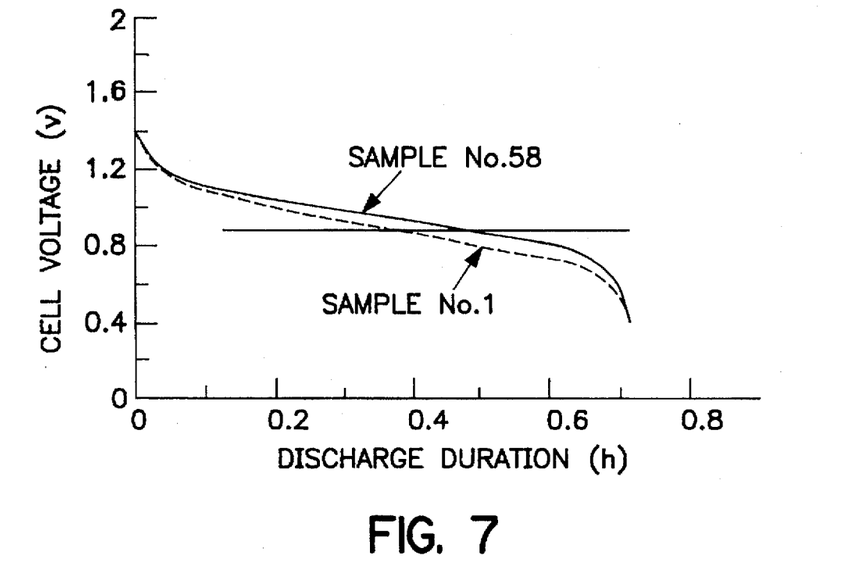
FIG. 7 shows the discharge characteristics of alkaline manganese batteries employing the positive active material of the present invention having a surface layer modified by La compound, compared with those obtained by employing a positive active material using conventional untreated EMD powder.

Some examples of the 1500 mA constant current discharge characteristics of LR6-size alkaline manganese batteries prepared by employing untreated EMD powder, and the ones employing the positive active material employing the EMD powder (Sample No. 58) whose surface is modified by a La compound are shown in FIG. 7.

TABLE 6

| Sample No. | 1 | 49 | 50 | 51 | 52 | 53 | 54 | 55 | 56 | 57 |
|---|---|---|---|---|---|---|---|---|---|---|
| Composition of Treatment Solution | | | | | | | | | | |
| $H_2SO_4$ (mol/l) | — | 2.0 | 2.0 | 2.0 | 2.0 | 2.0 | 2.0 | — | — | — |
| $SrSO_4$ (mol/l) | — | 0.2 | 0.2 | 0.2 | 0.2 | 0.2 | 0.2 | 0.2 | 0.2 | 0.2 |
| Oxidizing Agent | | | | | | | | | | |
| Air (ml/min) | — | — | — | — | 50 | — | — | — | 50 | — |

TABLE 6-continued

| Sample No. | 1 | 49 | 50 | 51 | 52 | 53 | 54 | 55 | 56 | 57 |
|---|---|---|---|---|---|---|---|---|---|---|
| $O_2$ (ml/min) | — | — | — | — | — | 50 | — | — | — | — |
| $O_3$ (ml/min) | — | — | — | — | — | — | 50 | — | — | — |
| $Na_2ClO_3$ | — | O | — | — | — | — | — | O | — | — |
| $Na_2S_2O_8 \cdot 2H_2O$ | — | — | O | — | — | — | — | — | — | — |
| Discharge Capacity Ratio | 100 | 106 | 106 | 104 | 105 | 104 | 104 | 105 | 106 | 103 |

TABLE 7

| Sample No. | 1 | 58 | 59 | 60 | 61 | 62 | 63 | 64 | 65 | 66 |
|---|---|---|---|---|---|---|---|---|---|---|
| Composition of Treatment Solution | | | | | | | | | | |
| $H_2SO_4$ (mol/l) | — | 2.0 | 2.0 | 2.0 | 2.0 | 2.0 | 2.0 | — | — | — |
| $LaSO_4$ (mol/l) | — | 0.2 | 0.2 | 0.2 | 0.2 | 0.2 | 0.2 | 0.2 | 0.2 | 0.2 |
| Oxidizing Agent | | | | | | | | | | |
| Air (ml/min) | — | — | — | — | 50 | — | — | — | 50 | — |
| $O_2$ (ml/min) | — | — | — | — | — | 50 | — | — | — | — |
| $O_3$ (ml/min) | — | — | — | — | — | — | 50 | — | — | — |
| $Na_2ClO_2$ | — | O | — | — | — | — | — | O | — | — |
| $Na_2S_2O_8 \cdot 2H_2O$ | — | — | O | — | — | — | — | — | — | — |
| Discharge Capacity Ratio | 100 | 107 | 106 | 105 | 107 | 107 | 106 | 105 | 106 | 104 |

Tables 6, 7 and 8 show that all of the discharge capacity ratios, obtained with EMD powders on which surface modified layers are formed by a Sr and/or La compound, and a Sr and/or La compound containing Mn compound, are higher than that obtained with untreated EMD powder (Sample No. 1), as improved discharge voltage.

In addition to these, a slight improvement of discharge capacity ratio is seen when the treatment solution is acidified by $H_2SO_4$ and when an oxidizing agent of any type is employed, although there is no observable obvious dependency on the type of oxidizing agent in this case also.

Like in the cases of Embodiments-3 and 4, higher apparent densities are observed with the EMD powders whose surfaces are modified by mixing a Mn compound in the layer. Moreover, apparent from FIG. 7, since the heavy load discharge voltage of the cell (Sample No. 58) employing the EMD powder whose surface is modified by La compound is higher than that employing the untreated EMD powder (Sample No. 1), there is an increase of discharge capacity up to a voltage of 0.9 V observed. However, no particular difference in the total capacity is observed.

TABLE 8

| Sample No. | 1 | 67 | 68 | 69 | 70 | 10 | 72 | 73 | 74 | 75 | 76 |
|---|---|---|---|---|---|---|---|---|---|---|---|
| Composition of Treatment Solution | | | | | | | | | | | |
| $H_2SO_4$ (mol/l) | — | 2.0 | 2.0 | 2.0 | 2.0 | 2.0 | 2.0 | 2.0 | — | — | — |
| $SrSO_4$ (mol/l) | — | 0.2 | — | 0.2 | 0.2 | 0.2 | 0.2 | 0.2 | 0.2 | 0.2 | 0.2 |
| $LaSO_4$ (mol/l) | — | 0.2 | 0.2 | — | 0.2 | 0.2 | 0.2 | 0.2 | 0.2 | 0.2 | 0.2 |
| $MnSO_4$ (mol/l) | — | — | 0.2 | 0.2 | 0.2 | 0.2 | 0.2 | 0.2 | 0.2 | — | 0.2 |
| Kind of Oxidizing Agent | | | | | | | | | | | |
| Air (ml/min) | — | — | — | — | — | — | 50 | — | — | — | — |
| $O_2$ (ml/min) | — | — | — | — | — | — | — | 50 | — | — | — |
| $O_3$ (ml/min) | — | — | — | — | — | — | — | — | 50 | — | — |
| $Na_2ClO_3$ | — | O | O | O | O | — | — | — | — | — | — |
| $Na_2S_2O_8 \cdot 2H_2O$ | — | — | — | — | — | O | — | — | — | — | — |
| Apparent Density (g/cm³) | 2.67 | 2.63 | 3.01 | 2.97 | 2.92 | 2.92 | 2.95 | 3.0 | 3.01 | 2.64 | 2.84 |
| Discharge Capacity Ratio | 100 | 105 | 105 | 105 | 106 | 107 | 106 | 107 | 105 | 103 | 103 |

All of the cells employing the other EMD powder whose surface is modified by another Sr and/or La compound and by a Sr and/or La compound including the Mn compound showed similar behavior.

Figure 8:
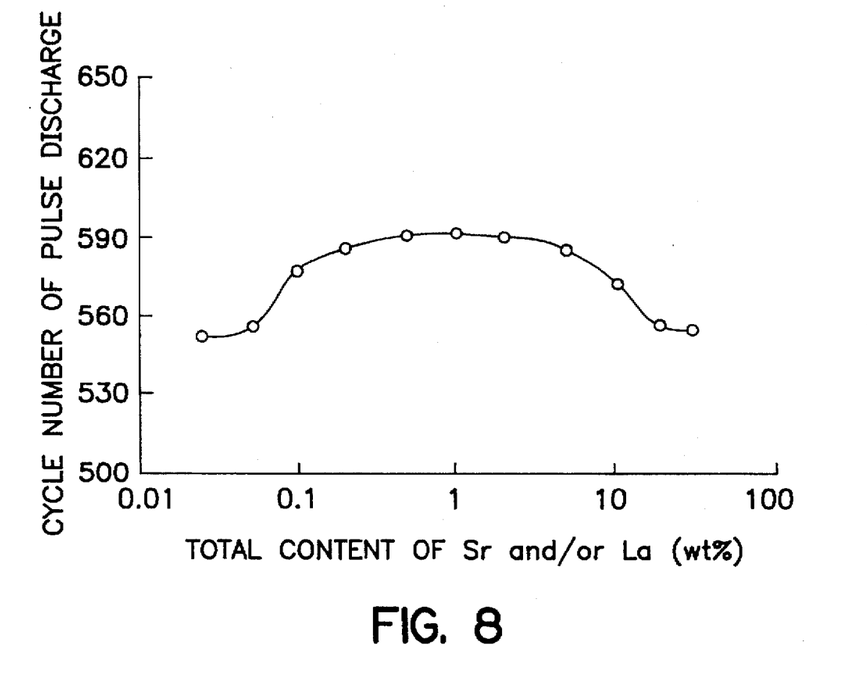
FIG. 8 shows a relationship between the total amount of Sr and/or La contained in the surface modified layer of EMD powder and the possible number of pulse discharges.

FIG. 8 shows the relationship between the pulse discharge cycle counts of LR6-size alkaline manganese batteries employing the EMD powder, whose surface is modified by depositing a Sr and La compound as its positive active material, and the total contents of Sr and La. FIG. 8 also shows that all of the batteries employing EMD powder whose surface is modified by a Sr and/or La compound show definite improvements of pulse discharge cycle counts, and it is particularly effective when the total content of Sr and/or La is in a range from 0.1–10.0 wt %.

In addition to this, an electron microscopic observation made of the EMD powder whose surface is modified by a Sr and/or La compound and a Sr and/or La compound containing Mn compound has shown less surface irregularities, like the other EMD powder whose surface is modified. In addition to this, higher apparent densities with the surface modified EMD powders containing Mn compound (Sample Nos. 68–74 and 76) are obtained, like in the other cases.

<Embodiment-6>

The performance of the positive active material developed for non-aqueous electrolyte secondary batteries of Sample Nos. 1–76, shown in Embodiments-1–5, have been tested.

Figure 9:
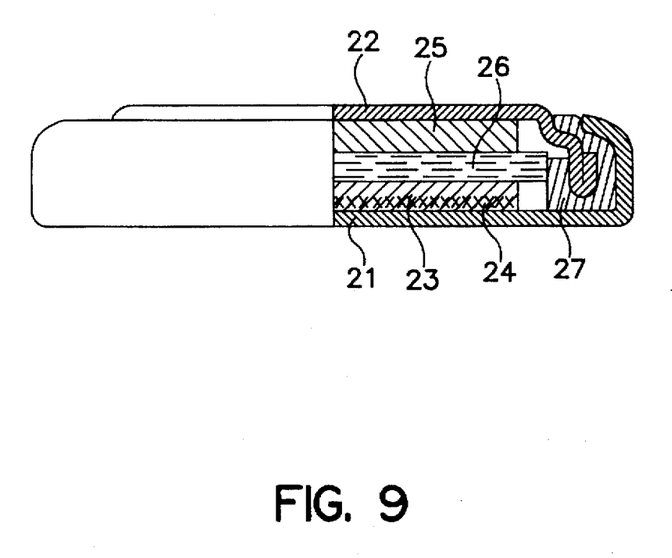
FIG. 9 shows a cross-sectional view of a coin type lithium ion secondary cell which is another typical example of the battery of the present invention.

A cross-section of a coin-type cell developed for the evaluation of the positive electrode in accordance with an exemplary embodiment of the present invention is shown in FIG. 9 wherein 21 is a cell-case made of stainless-steel anti-corrosive to the organic electrolyte, 22 is a cell cover made of the same material, 23 is the positive electrode of the present invention, 24 is a current collector for positive electrode 23 made of the same stainless-steel and is spot-welded to the internal surface of cell-case 21, 25 is negative electrode molded graphite powder and pressed against the inside of cell cover 22, 26 is a separator made of porous polypropylene, and 27 is an insulating gasket made of polypropylene. The evaluation cell coin-type has a diameter of 20 mm and an overall height of 1.5 mm.

The positive active material is prepared by mixing various surface modified EMDs prepared in advance with lithium hydroxide (LiOH) at a ratio which forms a double oxide of manganese and lithium, $LiMn_2O_4$ of prescribed composition. This mixture is sintered at a temperature of 860° C. for 70 hours in an oxidizing atmosphere. The positive electrode compound is prepared by mixing a conductive agent into polyvinylidenfluoride acting as a binder at a weight part of 5 to 5, and by mixing this mixture into the obtained positive active material at a weight part of 90, The electrode is prepared by molding the obtained positive electrode compound of a prescribed volume on current collector 24, and this is dried at a temperature of 150° C. under vacuum conditions, and this is assembled into a cell using a negative electrode 25.

Lithium perchlorate, dissolved in a solvent where ethylene carbonate and 1,3-dimethoxyethane are mixed at an equal volume obtaining a concentration of 1 mol/liter, is used as an electrolyte. Since a positive electrode deintercalated lithium-ions electrochemically to electrolyte by charging after the cell assembly, and intercalated the lithium ions from electrolyte by discharging, it is obvious that this composition functions as a positive electrode material for secondary batteries.

These evaluation cells were charged up to a voltage of 4.2 V at a rate of 0.2 mA/cm2, and then discharged to a voltage of 3.0 V at a rate of 0.2 $mA/cm^2$ and 1.0 $mA/cm^2$ at an ordinary temperature, and the discharge characteristics, depending on the difference of discharge rates have been determined.

Table 9 shows the ratio of discharge capacity at a rate of 1.0 $mA/cm^2$ to that at a rate of 0.2 $mA/cm^2$.

Here, the tests are conducted for Sample Nos. S-2, -9, -13, -14, -22, -31, -50, and -59 employing a concentration of sulfuric acid of 2.0 mol/l and a concentration of various sulfates of 0.2 mol/l as a condition of surface modification treatment, and employing sodium perchlorate as an oxidizing agent. These results are compared with those of EMD powder of Sample No. S-1 used as a starting material.

TABLE 9

| Sample No. | S-1 | S-2 | S-9 | S-13 | S-14 | S-22 | S-31 | S-50 | S-59 |
|---|---|---|---|---|---|---|---|---|---|
| Discharge Capacity Ratio (%) | 88 | 93 | 89 | 92 | 92 | 91 | 91 | 90 | 90 |

As shown in Table 9, the surface modified samples show better high-rate discharge characteristics than those obtained by the referenced sample No. S-1. Moreover, the same effects could be obtained if the surface modification were made on the samples other than those mentioned above.

<Embodiment-7>

Figure 10:
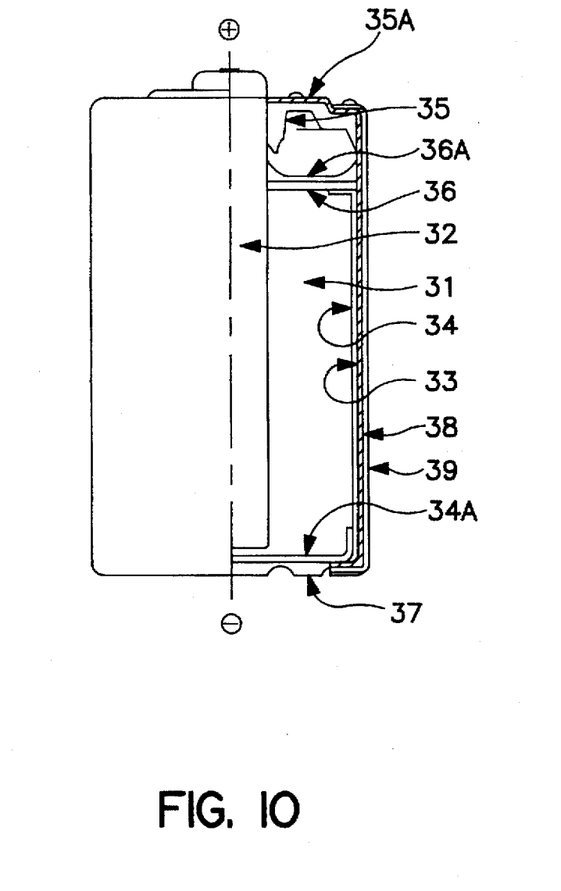
FIG. 10 shows a cross-sectional view of R20(D) size zinc chloride type carbon-zinc dry cell which is another typical example of the battery of the present invention.

Using the materials of Sample Nos. 1–76 shown in Embodiments-1–5 as a positive active material and zinc as a negative active material, the zinc chloride type carbon-zinc dry cells, shown in FIG. 10, are prepared.

In FIG. 10, there is a positive electrode mix 31, a carbon rod 32 acting as a positive current collector, a zinc can 33, a separator 34, a bottom paper 34A, a plastic sealing cover 35, a positive terminal plate 35A, a cover paper 36, a sealer 36A, a negative terminal plate 37, a PVC tube 38, and a metal jacket 39. Positive electrode mix 31 is prepared by mixing said manganese dioxide with acetylene-black at a weight ratio of 5:1, adding this into an electrolyte consisting of a mixed solution of zinc chloride and ammonium chloride, whose main constituent is zinc chloride, and by molding.

R20 (D) size carbon-zinc dry cells are prepared this way, and they are continuously discharged for a load of 2 Ohms at room temperature (20° C.), and the end voltage decreases to 0.9 V. These results are shown in Table 10.

TABLE 10

| Sample No. | 1 | 2 | 5 | 12 | 13 | 14 | 24 | 33 | 52 | 61 |
|---|---|---|---|---|---|---|---|---|---|---|
| Discharge Duration Ratio | 100 | 106 | 105 | 105 | 104 | 105 | 104 | 105 | 104 | 104 |

As shown in Table 10, carbon-zinc dry cells show better heavy-load discharge characteristics when a manganese dioxide having a surface modified layer is employed over the cases where the cells employ a manganese dioxide having an unmodified surface layer.

In an example, an alkaline manganese battery prepared by employing an EMD powder having a surface modified layer by a compound consisting mainly of oxide of at least one element selected out of a group of Ti, Co, Ni, Sr, and La, and used as the positive active material, the resistance polarization and the concentration polarization are obviously lowered at the heavy load and continuous discharge so that discharge characteristics of high efficiency can be obtained by the increased discharge voltage and the effective capacity. Those cases where a Mn compound is introduced in the surface modified layer are also found effective.

The effects observed with the above-mentioned surface layer modification are not necessarily limited only to the alkali manganese batteries. By conducting a surface modification by depositing a compound of at least one element selected from the group consisting of Ti, Co, Ni, Sr, and La on the surface of not only EMD but CMD and natural manganese dioxide (NMD), and by using this as a positive active material, those modifications can also be applied to Leclanche type and zinc chloride type, carbon-zinc dry batteries.

Moreover, by applying a heated dehydration treatment at a temperature from 350°–450° C. to said surface modified manganese dioxide powder, the positive active material for the Li/MnO$_2$ system, an organic electrolyte lithium primary battery having high rate discharge characteristics can be obtained.

Furthermore, by using a manganese oxide on which a surface modified layer is formed by depositing a compound of at least one element selected from the group consisting of Ti, Co, Ni, Sr, and La on the surface of LiMnO$_2$ or LiMn$_2$O$_4$ powder which is a double oxide of Mn and Li and by repeating the deintercalation and intercalation of Li by charge and discharge at the positive electrode, ever better charge and discharge characteristics can be obtained.

In these embodiments, although there is an example using a sulfate aqueous solution as the treatment solution for surface modification the treatment solution of the present invention is not necessarily limited to using sulfates.

When chlorides or nitrates, etc. are used as the positive active material of the battery after the treatment, the use of these salts can never be disturbed by the possible introduction of minute anions contained in the treatment solution. For instance, it may be well known that chloride solution is used as the treatment solution acting as the positive active material for carbon-zinc dry batteries wherein NH$_4$Cl and/or ZnCl$_2$ are used as electrolytes.

Thus, batteries may be produced which use a manganese oxide where the surface of manganese oxide powder consisting essentially of MnO2, Mn and Li of a double oxide is modified by the deposition of a compound consisting mainly of an oxide of at least one element selected from the group consisting of Ti, Co, Ni, Sr, and La as its positive active material, and a compound made mainly of a Mn oxide, by using a solution in which is dissolved a salt of at least one element selected from the group consisting of Ti, Co, Ni, Sr, and La to which a Mn salt is added.

And this is highly effective to improve the heavy load continuous discharge characteristics of primary batteries such as carbon-zinc dry batteries, alkaline manganese batteries, and Li/MnO$_2$ system organic electrolyte lithium batteries.

Furthermore, further improvements of high-rate charge and discharge characteristics with the lithium-ion secondary batteries can also be expected. These could be made possible by the reduction of resistance polarization and/or concentration polarization of the positive active material used therein.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A battery including manganese oxides comprising:

a manganese dioxide or a double oxide of manganese and lithium as a positive active material; and a surface modification layer on said manganese oxides of a compound including an oxide of at least one element selected from the group consisting of titanium, cobalt, nickel, strontium, and lanthanum.

2. A battery according to claim 1, wherein a compound consisting essentially of manganese oxide is dispersed in said surface modification layer.

3. A battery according to claim 1, wherein the battery is a carbon zinc dry battery and the manganese oxide is manganese dioxide powder.

4. A battery according to claim 2, wherein the battery is a carbon zinc dry battery and the manganese oxide is manganese dioxide powder.

5. A battery according to claim 1, wherein the battery is an alkaline manganese battery and the manganese oxide is manganese dioxide powder.

6. A battery according to claim 2, wherein the battery is an alkaline manganese battery and the manganese oxide is manganese dioxide powder.

7. A battery according to claim 1, wherein the battery is an alkaline manganese battery and electrolytic manganese dioxide powder is the positive active material.

8. A battery according to claim 2, wherein the battery is an alkaline manganese battery and electrolytic manganese dioxide powder is the positive active material.

9. A battery according to claim 1, wherein the battery is an organic lithium primary battery and heated and dehydrated manganese dioxide powder is the positive active material.

10. A battery according to claim 2, wherein the battery is an organic lithium primary battery and heated and dehydrated manganese dioxide powder is the positive active material.

11. A battery according to claim 1, wherein the battery is a lithium-ion secondary battery and powder of a double oxide of manganese and lithium is the positive active material.

12. A battery according to claim 2, wherein the battery is a lithium-ion secondary battery and powder of a double oxide of manganese and lithium is the positive active material.

* * * * *